(12) United States Patent
Smirnova

(10) Patent No.: US 9,280,524 B2
(45) Date of Patent: Mar. 8, 2016

(54) COMBINING A HANDWRITTEN MARKING WITH A RENDERED SYMBOL TO MODIFY THE RENDERED SYMBOL

(71) Applicant: Texas Instruments Incorporated, Dallas, TX (US)

(72) Inventor: Elena Smirnova, Plano, TX (US)

(73) Assignee: TEXAS INSTRUMENTS INCORPORATED, Dallas, TX (US),`

( * ) Notice: Subject to any disclaimer, the term of this patent is extended or adjusted under 35 U.S.C. 154(b) by 269 days.

(21) Appl. No.: 13/927,802

(22) Filed: Jun. 26, 2013

(65) Prior Publication Data
US 2014/0006941 A1 Jan. 2, 2014

Related U.S. Application Data
(60) Provisional application No. 61/665,442, filed on Jun. 28, 2012.

(51) Int. Cl.
*G06F 17/21* (2006.01)
*G06F 17/24* (2006.01)

(52) U.S. Cl.
CPC ............ *G06F 17/214* (2013.01); *G06F 17/215* (2013.01); *G06F 17/242* (2013.01)

(58) Field of Classification Search
CPC ..................................................... G06F 17/242
See application file for complete search history.

(56) References Cited

U.S. PATENT DOCUMENTS

| | | | | |
|---|---|---|---|---|
| 5,428,805 A * | 6/1995 | Morgan | ............... | G06F 3/04883 345/173 |
| 5,710,831 A * | 1/1998 | Beernink | ............ | G06F 3/04883 382/189 |
| 6,690,364 B1 * | 2/2004 | Webb | .................. | G06F 3/04883 345/173 |
| 7,002,560 B2 * | 2/2006 | Graham | .............. | G06F 3/04883 345/169 |
| 8,116,569 B2 * | 2/2012 | Markiewicz | .......... | G06F 3/0237 345/179 |
| 8,166,388 B2 * | 4/2012 | Gounares | .............. | G06F 3/0481 715/230 |
| 8,659,567 B2 * | 2/2014 | Yoshizawa | .......... | G06F 3/04883 178/18.01 |
| 2004/0001649 A1 * | 1/2004 | Simmons | ............... | G06K 9/222 382/321 |
| 2004/0054701 A1 * | 3/2004 | Garst | .................. | G06F 3/04883 708/131 |
| 2005/0099406 A1 * | 5/2005 | Pettiross | ............... | G06F 3/0236 345/179 |
| 2007/0263946 A1 * | 11/2007 | Sheets | ..................... | G06K 9/222 382/310 |
| 2008/0260240 A1 * | 10/2008 | Vukosavljevic | ... | G06K 9/00436 382/159 |
| 2009/0049375 A1 * | 2/2009 | Aughenbaugh | ....... | G06F 17/242 715/253 |
| 2010/0074527 A1 * | 3/2010 | Vukosavljevic et al. | ...... | 382/187 |
| 2010/0302164 A1 * | 12/2010 | Pienimaa | ................ | G06F 3/018 345/168 |

\* cited by examiner

*Primary Examiner* — Scott Baderman
*Assistant Examiner* — Asher Kells
(74) *Attorney, Agent, or Firm* — Michael A. Davis, Jr.; Frank D. Cimino

(57) ABSTRACT

A first rendering of symbols is generated with typeset font, and the first rendering is displayed by a display device. From among the symbols, a selection is received from a user. A second rendering of the selection is generated with ink font, and the second rendering is displayed by the display device. At least one handwritten edit to the second rendering is received from the user, and recognition of the handwritten edit is performed. The selection is updated to incorporate the recognized handwritten edit. A third rendering of the updated selection is generated with typeset font, and the third rendering is displayed by the display device for replacing at least a portion of the first rendering.

30 Claims, 8 Drawing Sheets

COMBINING A HANDWRITTEN MARKING WITH A RENDERED SYMBOL TO MODIFY THE RENDERED SYMBOL

CROSS-REFERENCE TO RELATED APPLICATION

This application claims priority to U.S. Provisional Patent Application Ser. No. 61/665,442, filed Jun. 28, 2012, entitled EDITING TYPESET MATHEMATICAL FORMULAE USING MATH HANDWRITING RECOGNITION-ENABLED PEN INTERFACES, naming Elena Smirnova as inventor, which is hereby fully incorporated herein by reference for all purposes.

BACKGROUND

The disclosures herein relate in general to information handling systems, and in particular to a method, system and computer program product for editing a displayed rendering of symbols.

For composing (e.g., typing) and/or revising symbols (e.g., alphanumeric characters and mathematical operators) on an electronics device, a conventional user interface may be relatively cumbersome. In a first example, if the symbols form a mathematical formula, then a conventional keyboard may be relatively cumbersome for composing the mathematical formula. In a second example, if the mathematical formula is rendered with typeset font on a display device, then a conventional touchscreen may be relatively cumbersome for revising the typeset font.

SUMMARY

A first rendering of symbols is generated with typeset font, and the first rendering is displayed by a display device. From among the symbols, a selection is received from a user. A second rendering of the selection is generated with ink font, and the second rendering is displayed by the display device. At least one handwritten edit to the second rendering is received from the user, and recognition of the handwritten edit is performed. The selection is updated to incorporate the recognized handwritten edit. A third rendering of the updated selection is generated with typeset font, and the third rendering is displayed by the display device for replacing at least a portion of the first rendering.

DETAILED DESCRIPTION

Figure 1:
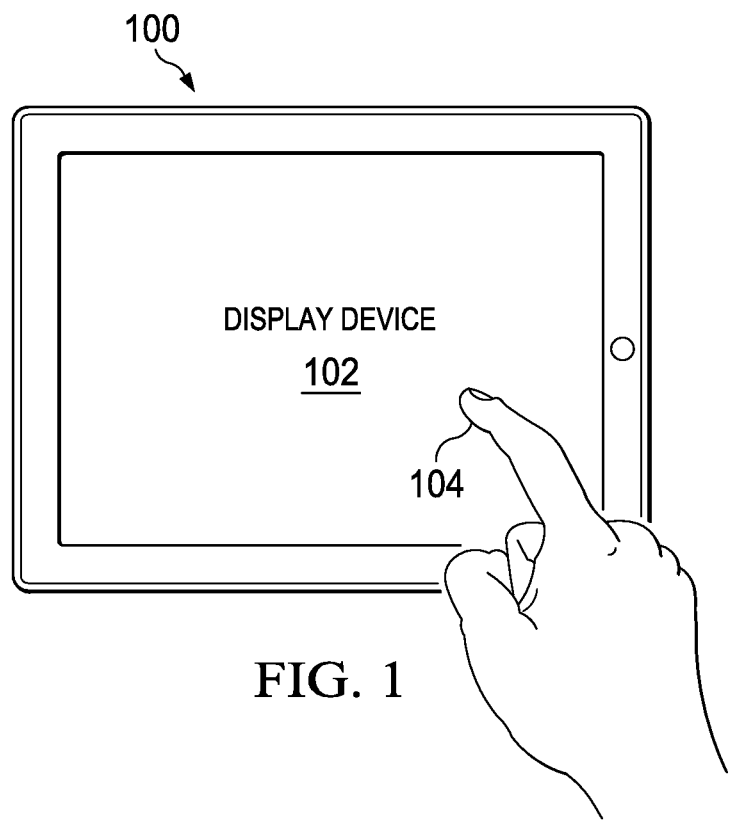
FIG. 1 is a top view of an information handling system of the illustrative embodiments.

FIG. 1 is a top view of an information handling system (e.g., a portable handheld electronics device, such as a tablet computing device, a mobile smartphone, a netbook computer, a laptop computer, or a graphing calculator), indicated generally at 100, of the illustrative embodiments. Accordingly, the system 100 executes various processes and performs operations (e.g., processing, displaying and otherwise communicating information) in response thereto. The system 100 includes a display device 102 for displaying and receiving information.

Figure 2:
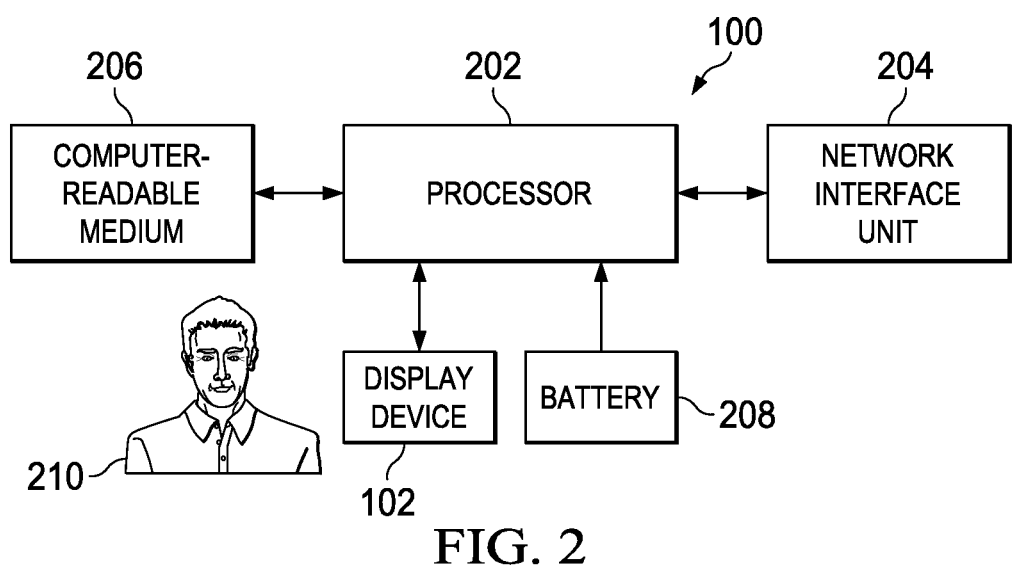
FIG. 2 is a block diagram of the system of FIG. 1.

FIG. 2 is a block diagram of the system 100. The system 100 includes various electronic circuitry components for performing the system 100 operations, implemented in a suitable combination of software, firmware and hardware. Such components include: (a) a processor 202 (e.g., microprocessor, microcontroller, and/or digital signal processor), which is a general purpose computational resource for executing instructions of computer-readable software programs to process data (e.g., a database of information) and perform additional operations (e.g., communicating information) in response thereto; (b) a network interface unit 204 for communicating information to and from a network; (c) a computer-readable medium 206 for storing information, such as a nonvolatile storage device and/or a random access memory ("RAM") device; (d) a battery 208, which is a source of power for the system 100; (e) the display device 102 for displaying information to a human user 210 and for receiving information from the user 210; and (f) other electronic circuitry for performing additional operations. In the illustrative embodiments, the various electronic circuitry components of the system 100 are housed integrally with one another.

Accordingly, the system 100 performs its operations in response to instructions of computer-readable software programs, which are stored on the computer-readable medium 206. Such programs include, but are not limited to: (a) applications, such as applications for word processing, calculator, data collection, lists, statistics, graphing, geometry, querying, polling (e.g., quick polling), and various other functions; (b) a window, dialog and event manager; (c) a settings manager; (d) a power manager; (e) a communication stack; (f) a display driver; (g) a touchpad driver; (h) a universal serial bus ("USB") interface driver; (i) a wireless interface driver; and (j) boot code. Also, the computer-readable medium 206 stores data that are processed by the processor 202, in response to the processor 202 executing such programs.

As shown in FIG. 1, the processor 202 is connected to the display device 102, the computer-readable medium 206, and the battery 208. For clarity, although FIG. 1 shows the battery 208 connected to only the processor 202, the battery 208 is further coupled to various other components of the system 100. Also, the processor 202 is coupled through the network interface unit 204 to the network (not shown in FIG. 1), such as a Transport Control Protocol/Internet Protocol ("TCP/IP") network (e.g., the Internet or an intranet). For example, the network interface unit 204 communicates information by outputting information to, and receiving information from, the processor 202 and the network, such as by transferring information (e.g. instructions, data, signals) between the processor 202 and the network (e.g., wirelessly or through a USB interface).

The system 100 operates in association with the user 210. In response to signals from the processor 202, the display device 102 displays visual images, which represent information, so that the user 210 is thereby enabled to view the visual images. Also, in the illustrative embodiments, the display device 102 is a touchscreen, such as: (a) a liquid crystal display ("LCD") device; and (b) touch-sensitive circuitry of such LCD device, so that the touch-sensitive circuitry is integral with such LCD device. Accordingly, the user 210 operates the display device 102 (e.g., virtual keys thereof, such as a virtual keyboard and/or virtual keypad) for specifying information (e.g., alphanumeric text information) to the processor 202, which receives such information from the display device 102.

For example, referring also to FIG. 1, the display device 102: (a) detects presence and location of a physical touch (e.g., by a finger 104 of the user 210, and/or by a passive stylus object) on a display area of such touchscreen; and (b) in response thereto, outputs signals (indicative of such detected presence and location) to the processor 202. In that manner, the user 210 can physically touch (e.g., single tap, double tap, and/or press-and-hold) the display device 102 to: (a) select a portion (e.g., region) of a visual image that is then-currently displayed by the display device 102; and/or (b) cause the display device 102 to output various information to the processor 202. Accordingly: (a) the processor 202 executes a computer-readable software program; (b) such program is stored on the computer-readable medium 206; and (c) in response to instructions of such program, and in response to such physical touch, the processor 202 causes the display device 102 to display various screens.

Figure 3:
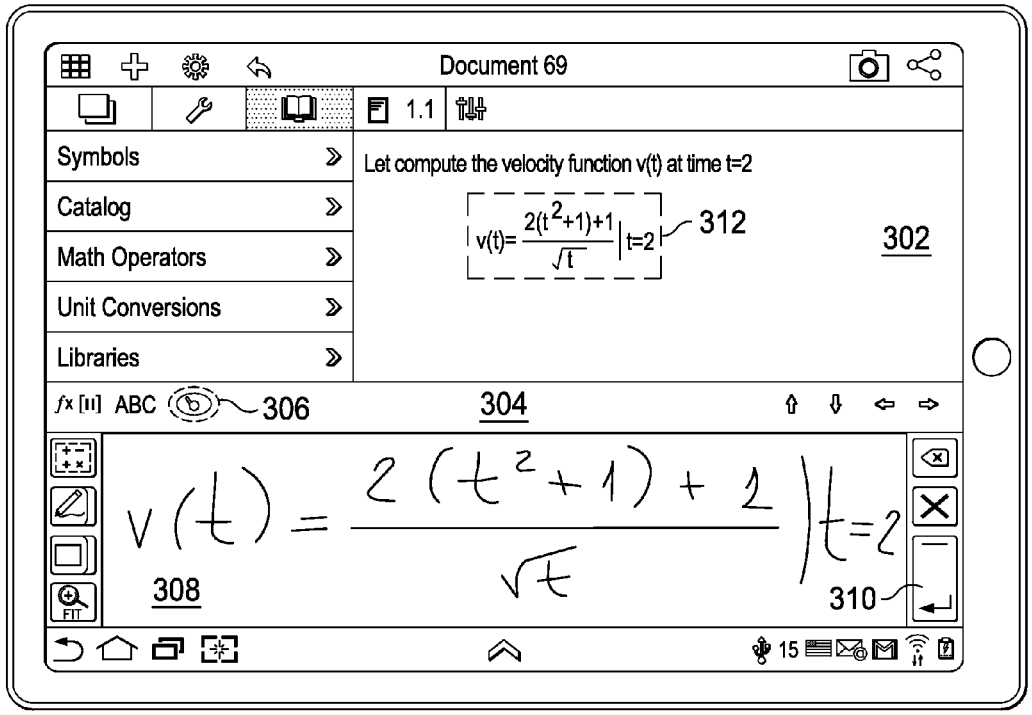
FIG. 3 is a diagram of a first example screen that is displayed by a display device of the system of FIG. 1.

FIG. 3 is a diagram of a first example screen that is displayed by the display device 102. In this example: (a) the user 210 has physically touched (e.g., single tapped) a typeset font region 302 of a window on the display device 102; and (b) in response thereto, the processor 202 causes the display device 102 to display an editing window 304 for viewing (on the display device 102) by the user 210. The editing window 304 is associated with the typeset font region 302.

As shown in the example of FIG. 3, the editing window 304 includes: (a) a handwriting mode button 306; (b) a handwriting region 308, which the processor 202 causes the display device 102 to display as a grid pattern of regularly spaced vertical and horizontal lines; and (c) an enter button 310. Further, in this example: (a) the user 210 has physically touched the handwriting mode button 306; and (b) in response thereto, the processor 202 receives handwritten markings that the user 210 draws by physically touching the handwriting region 308. After such drawing on the handwriting region 308, the user 210 physically touches the enter button 310. In response thereto, the processor 202: (a) performs recognition of such markings on the handwriting region 308; (b) in response to such recognized markings, generates and encodes symbols (e.g., alphanumeric characters and mathematical operators) having a native (e.g., LaTex) format ("native version"); (c) generates a rendering of the native version with typeset font ("rendered typeset formula"); and (d) causes the display device 102 to display the rendered typeset formula in the region 302 for viewing (on the display device 102) by the user 210.

In the example of FIG. 3, the processor 202 has caused the display device 102 to display the rendered typeset formula as a mathematical formula 312, which is formed by the encoded symbols as:

$$v(t) = \frac{2 \cdot (t^2 + 1) + 1}{\sqrt{t}} |t = 2|$$

Figure 4:
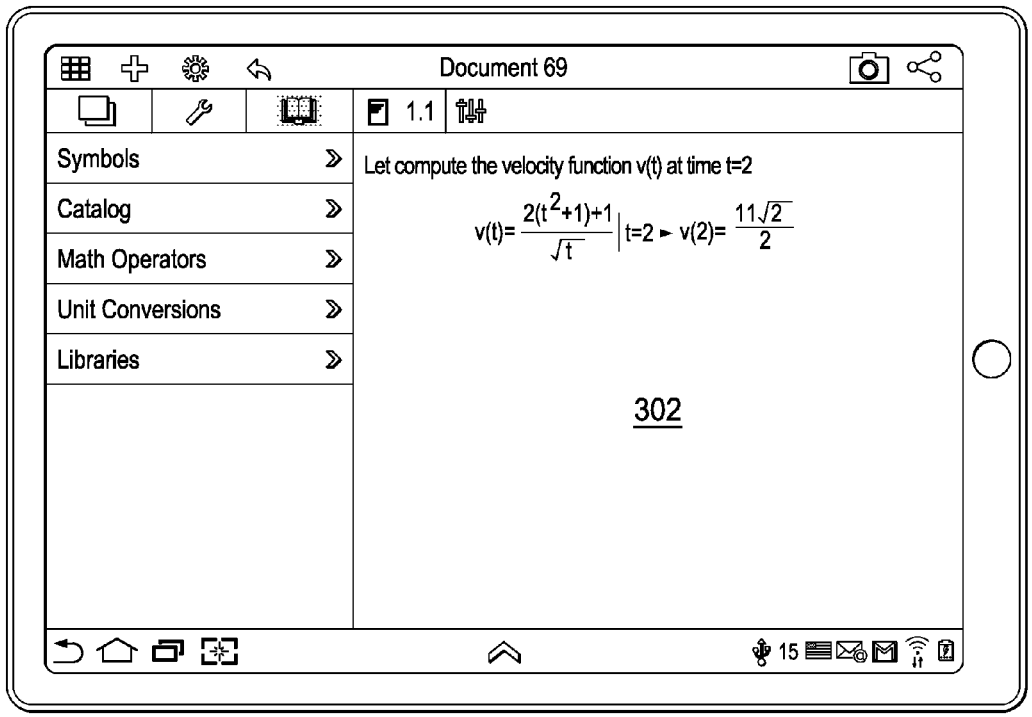
FIG. 4 is a diagram of a second example screen that is displayed by the display device of the system of FIG. 1.

FIG. 4 is a diagram of a second example screen that is displayed by the display device 102. In this example: (a) after the processor 202 caused the display device 102 to display the mathematical formula 312 of FIG. 3, the user 210 has again physically touched (e.g., single tapped) the typeset font region 302 on the display device 102; and (b) in response thereto, the processor 202 evaluates the mathematical formula 312 and causes the display device 102 to clear (e.g., erase) its display of the editing window 304 (FIG. 3). In one embodiment, as part of such clearing, the processor 202 discards (e.g., ceases to store) the handwritten markings (FIG. 3) that the user 210 drew on the editing window 304, so those handwritten markings become unavailable for subsequent operation of the system 100. In evaluating the mathematical formula 312 (where t=2), the processor 202 causes the display device 102 to display a result of such evaluation, which is v(2)=11·√2/2 as shown in FIG. 4.

Figure 5:
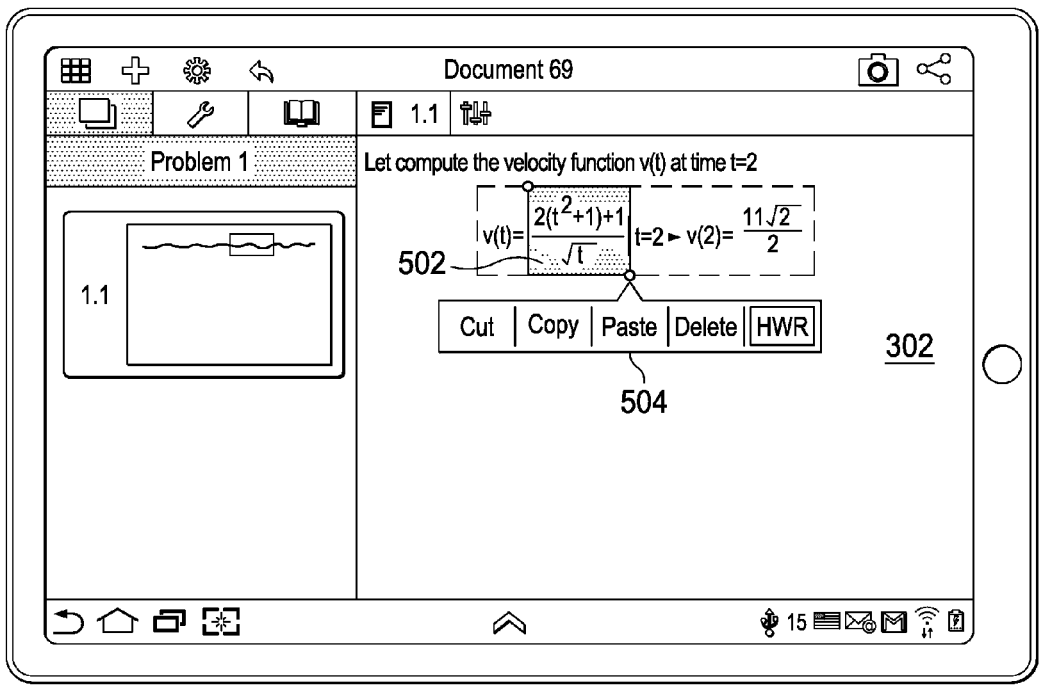
FIG. 5 is a diagram of a third example screen that is displayed by the display device of the system of FIG. 1.

FIG. 5 is a diagram of a third example screen that is displayed by the display device 102. In this example: (a) the user 210 has operated (by physically touching) the display device 102 to select a portion of the mathematical formula 312 (FIG. 3), so that the processor 202 receives (from the user 210) a selection 502 from among the encoded symbols of the native version; and (b) in response thereto, the processor 202 causes the display device 102 to highlight the selection 502 and display a menu 504. The menu 504 includes a "Cut" button, a "Copy" button, a "Paste" button, a "Delete" button, and a handwriting ("HWR") button. In response to the user 210 physically touching any of those buttons, the processor 202 causes the display device 102 to clear (e.g., erase) its display of the menu 504.

In response to the user 210 physically touching the "Cut" button, the processor 202 stores the selection 502 in a paste buffer of the computer-readable medium 206 (FIG. 2) and causes the display device 102 to: (a) clear (e.g., erase) its display of the selection 502; and (b) concatenate portions of the mathematical formula 312 (FIG. 3) that continue being displayed by the display device 102. In response to the user 210 physically touching the "Copy" button, the processor 202 stores the selection 502 in the paste buffer. In response to the user 210 physically touching the "Paste" button, the processor 202: (a) reads information that is then-currently stored in the paste buffer; and (b) causes the display device 102 to display such information in place of the selection 502 within the mathematical formula 312 (FIG. 3). In response to the user 210 physically touching the "Delete" button, the processor 202 causes the display device 102 to: (a) clear (e.g., erase) its display of the selection 502; and (b) concatenate portions of the mathematical formula 312 (FIG. 3) that continue being displayed by the display device 102.

Figure 6:
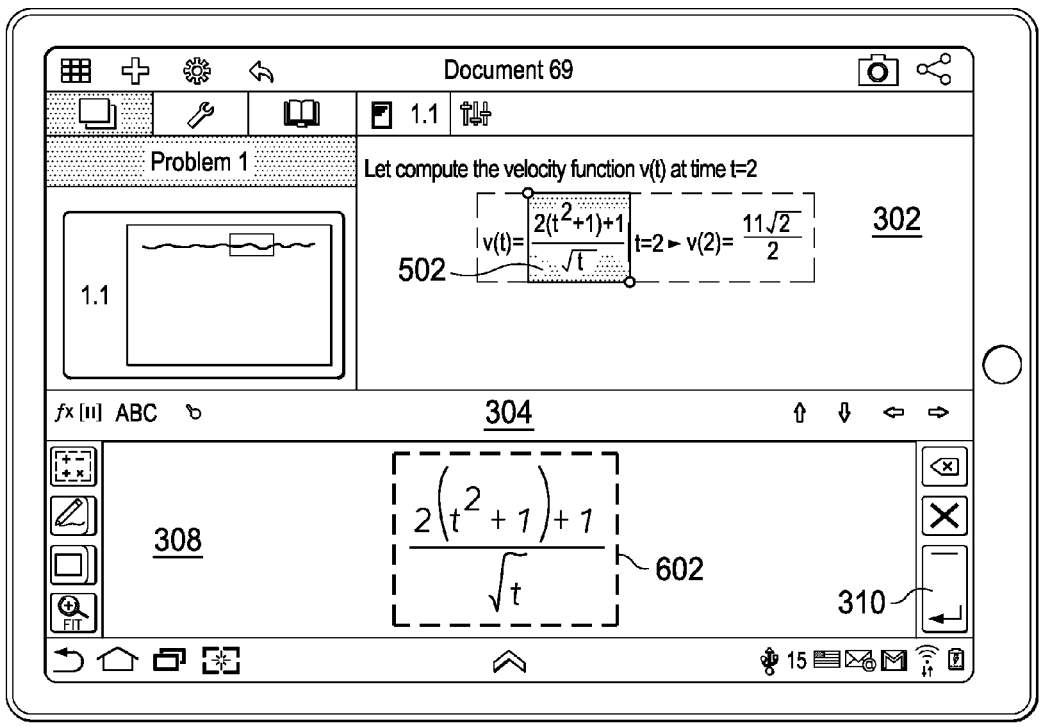
FIG. 6 is a diagram of a fourth example screen that is displayed by the display device of the system of FIG. 1.

FIG. 6 is a diagram of a fourth example screen that is displayed by the display device 102. In this example, the user 210 has physically touched (e.g., single tapped) the "HWR" button of the menu 504 (FIG. 5). In response thereto, the processor 202: (a) causes the display device 102 to display the editing window 304 for viewing (on the display device 102) by the user 210; (b) translates a native version of the selection 502 into a markup language (e.g., MathML) format ("markup language version") thereof; (c) generates a rendering 602 of the markup language version with ink font ("rendered ink formula"); and (d) causes the display device 102 to display the rendered ink formula in the handwriting region 308 for viewing (on the display device 102) by the user 210.

In the illustrative embodiment, ink font includes predefined digital ink strokes, whose properties appear similar to those of handwritten ink stokes. Ink font is different from typeset font, because ink font's glyphs are predefined as sets of digital ink strokes, in which each digital ink stroke has a respective sequence of x and y coordinates and optionally may have additional properties (e.g., velocity and/or pressure). By comparison, typeset font's glyphs typically have geometrical paths, which encode the glyph's outline.

Figure 7:
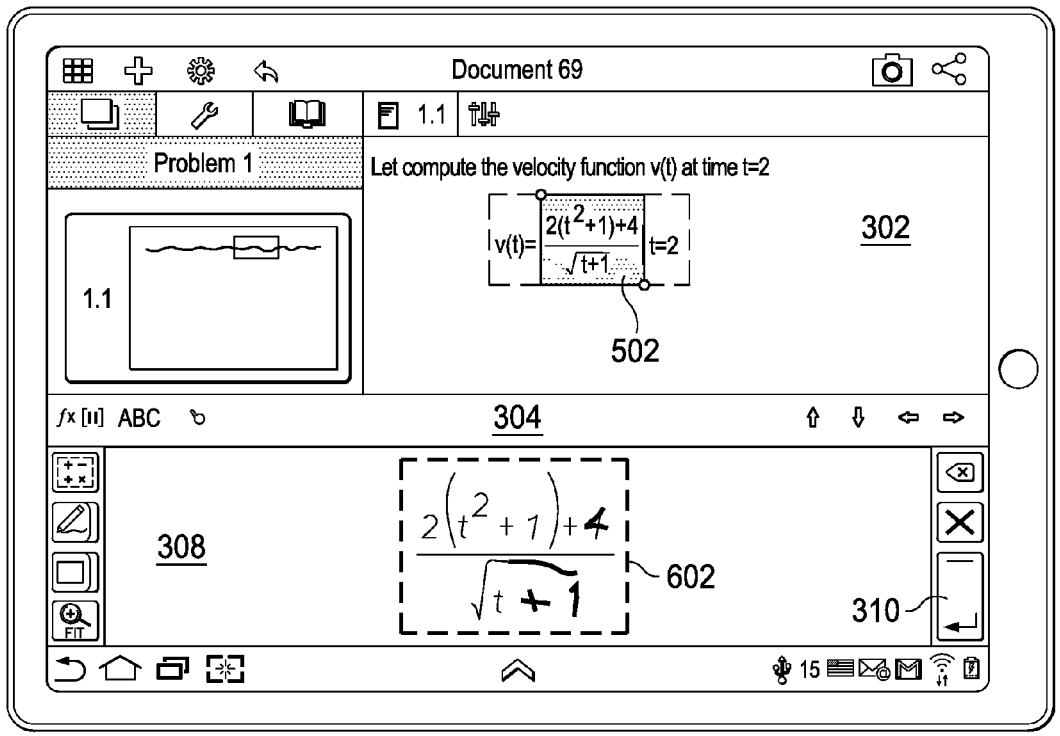
FIG. 7 is a diagram of a fifth example screen that is displayed by the display device of the system of FIG. 1.

FIG. 7 is a diagram of a fifth example screen that is displayed by the display device 102. In this example: (a) the user 210 has drawn handwritten edits (e.g., revisions) by physically touching (e.g., tracing or dragging in) the handwriting region 308; and (b) in response thereto, the processor 202 receives such edits and causes the display device 102 to display such edits superimposed upon the rendered ink formula. As shown in FIG. 7, such edits include: (a) a first marking that changes a "1" to a "4" in a numerator of the rendered ink formula; (b) a second marking that extends a length of a square root symbol in a denominator of the rendered ink formula; and (c) a third marking that inserts "+1" under the second marking. A displayed size of the rendered ink formula (in the handwriting region 308) is significantly larger than a displayed size of the rendered typeset formula (in the typeset font region 302), so the user 210 is able to conveniently draw such edits on the handwriting region 308.

In response to the user 210 drawing such edits on the handwriting region 308, the processor 202 automatically: (a) performs recognition of such edits; (b) updates the markup language version to incorporate such recognized edits within a replacement formula; (c) translates the updated markup language version into a native version of the replacement formula ("native replacement formula"); (d) generates a rendering of the native replacement formula with typeset font ("typeset replacement formula"); and (e) causes the display device 102 to display the typeset replacement formula in the selection 502 for viewing (on the display device 102) by the user 210 and to clear (e.g., erase) its display of the result of the previous evaluation, as shown in FIG. 7.

Figure 8:
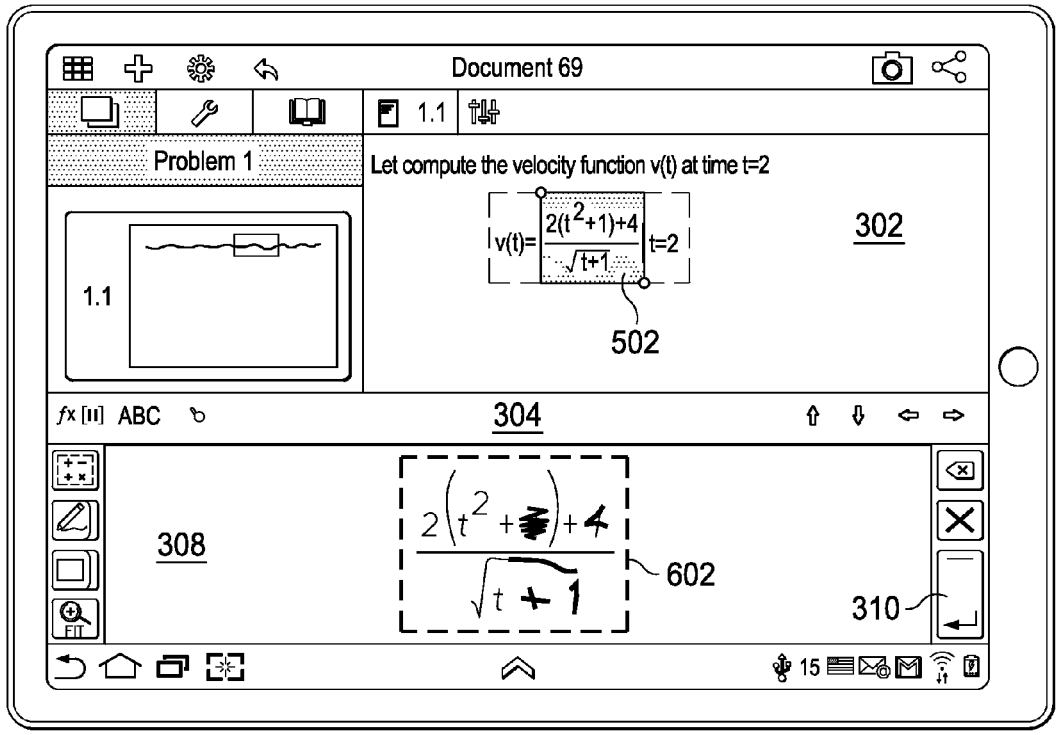
FIG. 8 is a diagram of a sixth example screen that is displayed by the display device of the system of FIG. 1.

FIG. 8 is a diagram of a sixth example screen that is displayed by the display device 102. In this example: (a) the user 210 has drawn an extra handwritten edit by physically touching the handwriting region 308; and (b) in response thereto, the processor 202 receives the extra handwritten edit and causes the display device 102 to display such edit superimposed upon the rendered ink formula. As shown in FIG. 8, the extra handwritten edit is a marking that crosses out (e.g., using a scratch gesture) a "1" in the numerator of the rendered ink formula.

Figure 9:
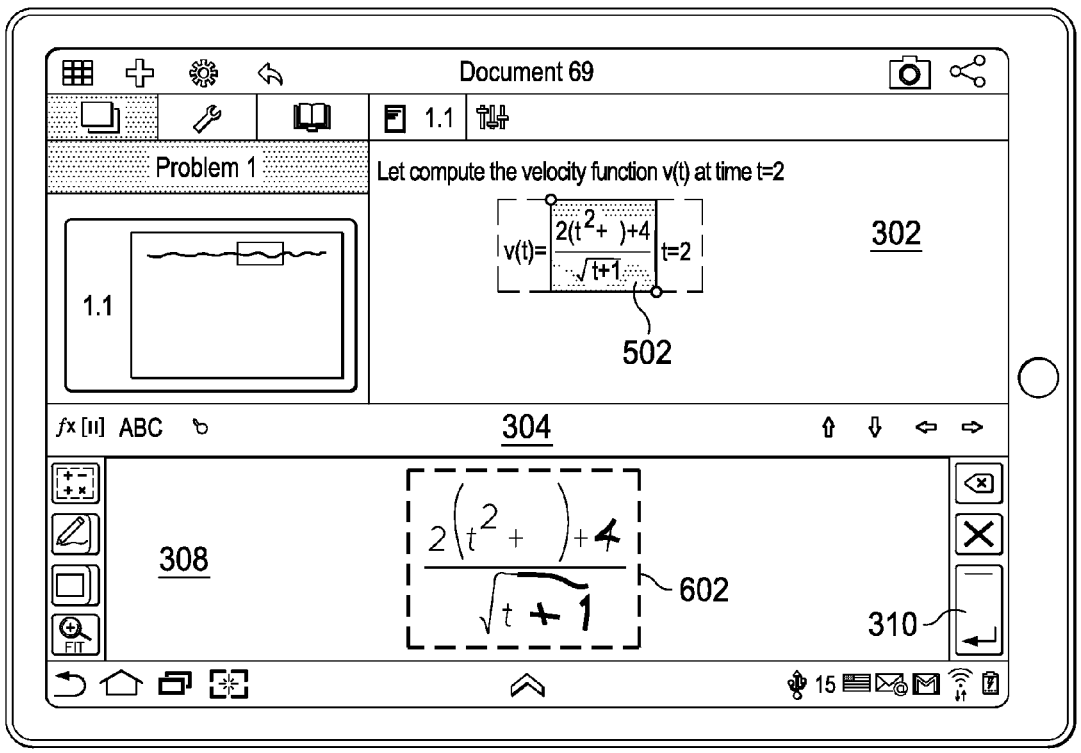
FIG. 9 is a diagram of a seventh example screen that is displayed by the display device of the system of FIG. 1.

FIG. 9 is a diagram of a seventh example screen that is displayed by the display device 102. In this example, in response to the user 210 drawing the extra handwritten edit of FIG. 8, the processor 202 automatically: (a) performs recognition of the extra handwritten edit; (b) updates the markup language version to incorporate such recognized edit within a replacement formula; (c) translates the updated markup language version into a native version of the replacement formula ("native replacement formula"); (d) generates a rendering of the native replacement formula with typeset font ("typeset replacement formula"); and (e) causes the display device 102 to display the typeset replacement formula in the selection 502 for viewing (on the display device 102) by the user 210, as shown in FIG. 9. Accordingly, in response to the user 210 crossing out (e.g., deleting) the "1" in the numerator of the rendered ink formula, the processor 202 automatically causes the display device 102 to clear (e.g., erase) its display of the "1": (a) in the numerator of the replacement formula (in the selection 502); and (b) likewise, in the numerator of the rendered ink formula (in the handwriting region 308).

Figure 10:
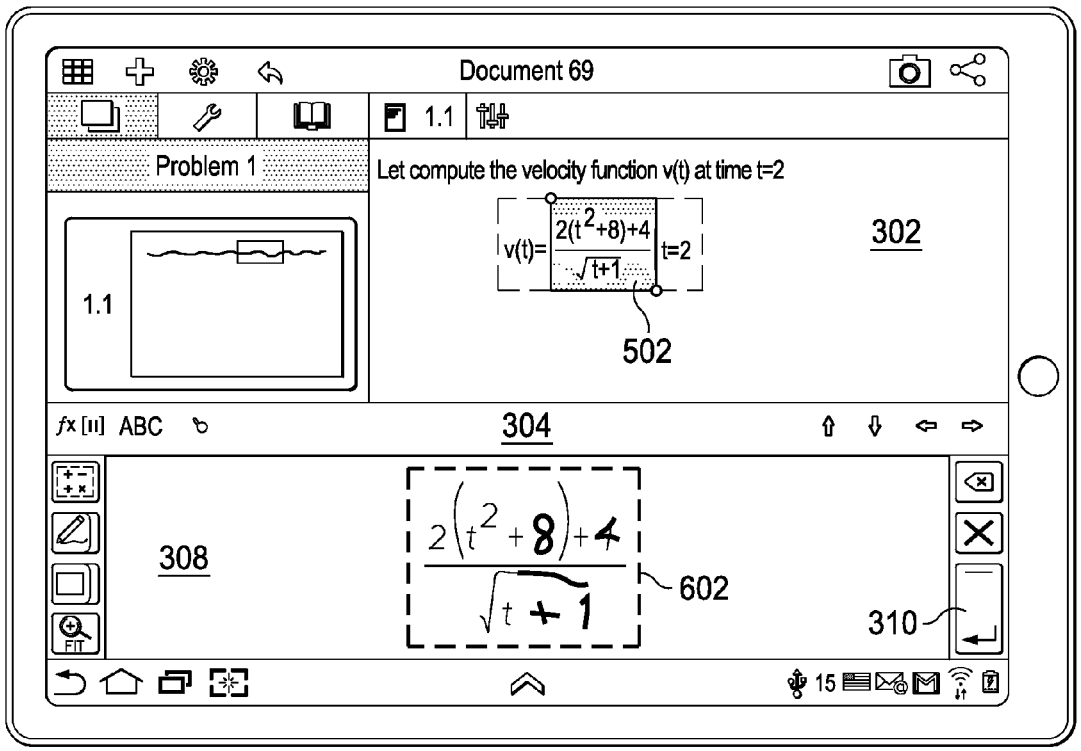
FIG. 10 is a diagram of an eighth example screen that is displayed by the display device of the system of FIG. 1.

FIG. 10 is a diagram of an eighth example screen that is displayed by the display device 102. In this example: (a) the user 210 has drawn a further handwritten edit by physically touching the handwriting region 308; and (b) in response thereto, the processor 202 receives the further handwritten edit and causes the display device 102 to display such edit superimposed upon the rendered ink formula. As shown in FIG. 10, the further handwritten edit is a marking that inserts an "8" in the numerator of the rendered ink formula. In response to such insertion, the processor 202 automatically: (a) performs recognition of the further handwritten edit; (b) updates the markup language version to incorporate such recognized edit within a replacement formula; (c) translates the updated markup language version into a native version of the replacement formula ("native replacement formula"); (d) generates a rendering of the native replacement formula with typeset font ("typeset replacement formula"); and (e) causes the display device 102 to display the typeset replacement formula in the selection 502 for viewing (on the display device 102) by the user 210. Accordingly, in response to the user 210 inserting the "8" in the numerator of the rendered ink formula, the processor 202 automatically causes the display device 102 to insert the "8" in the numerator of the typeset replacement formula, as shown in FIG. 10.

Figure 11:
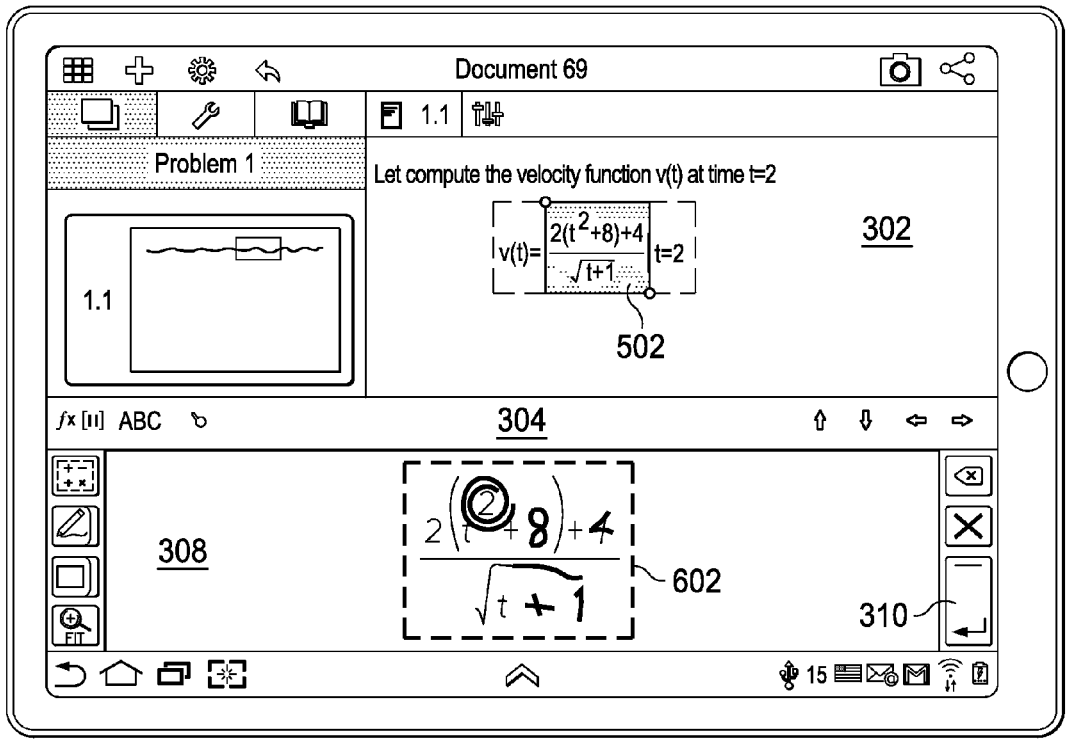
FIG. 11 is a diagram of a ninth example screen that is displayed by the display device of the system of FIG. 1.
Figure 12:
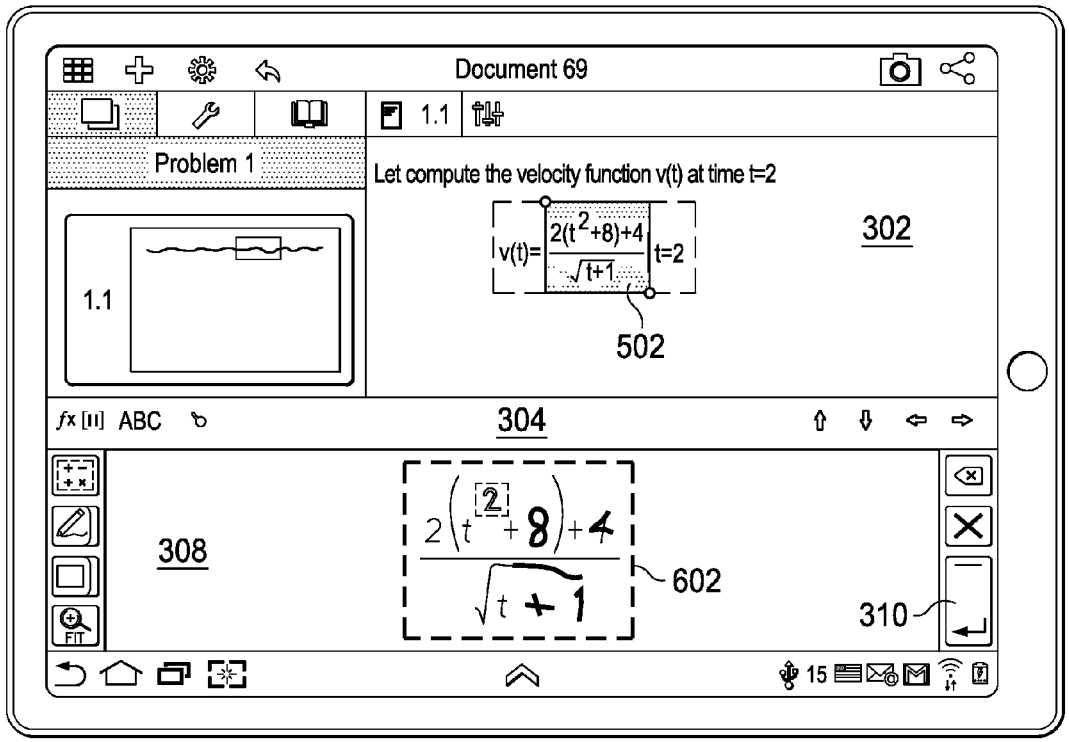
FIG. 12 is a diagram of a tenth example screen that is displayed by the display device of the system of FIG. 1.

FIG. 11 is a diagram of a ninth example screen that is displayed by the display device 102. FIG. 12 is a diagram of a tenth example screen that is displayed by the display device 102. As shown in FIG. 11: (a) the user 210 has drawn two continuous handwritten circles (around a superscript "2") by physically touching the handwriting region 308; and (b) in response thereto, the processor 202 receives the circles and causes the display device 102 to display the circles superimposed upon the rendered ink formula. Moreover, as shown in FIG. 12, in response to the user 210 drawing the circles, the processor 202: (a) performs recognition of the circles as selecting the superscript "2"; and (b) causes the display device 102 to visually indicate such recognition, such as by displaying the selected superscript "2" with outlined ink strokes and clearing (e.g., erasing) its display of the handwritten circles.

Figure 13:
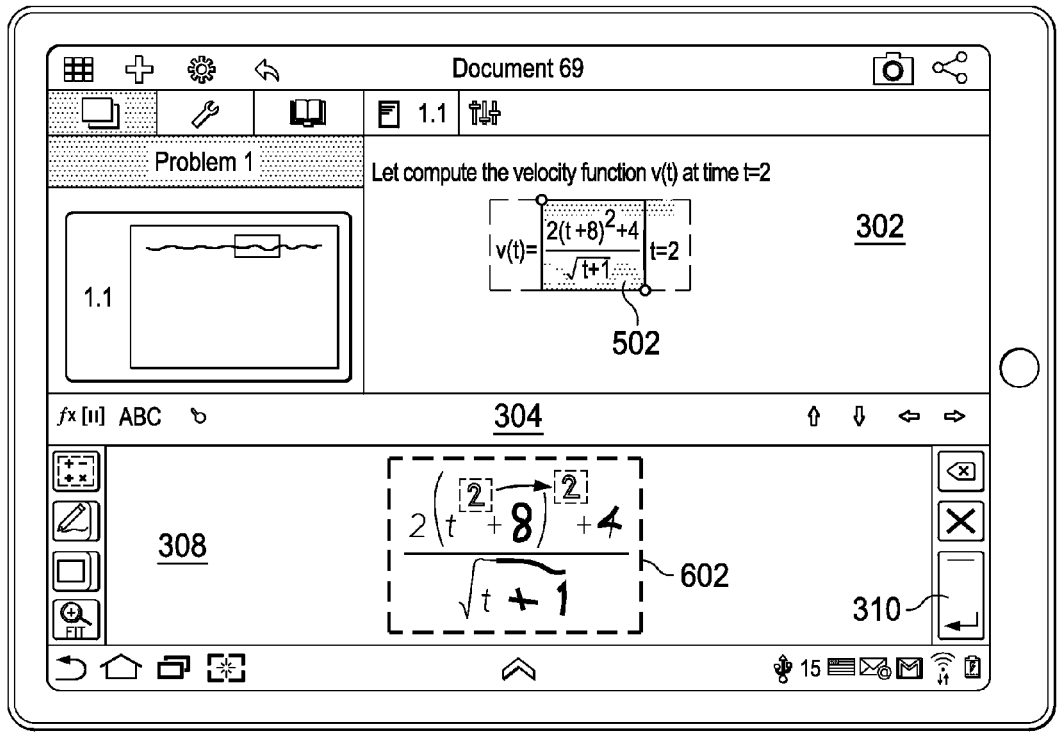
FIG. 13 is a diagram of an eleventh example screen that is displayed by the display device of the system of FIG. 1.

FIG. 13 is a diagram of an eleventh example screen that is displayed by the display device 102. In this example: (a) the user 210 physically touches (e.g., by press-and-hold) and slides the selected superscript "2" in the handwriting region 308, so that the user 210 directly repositions the selected superscript "2" from its original location (inside the parenthesis) to a different location (outside the parenthesis), as shown in FIG. 13. In response to such repositioning, the processor 202 causes the display device 102 to display the selected superscript "2" at the different location (instead of its original location) in the handwriting region 308. Moreover, in response to such repositioning, the processor 202: (a) updates the markup language version to incorporate such repositioning within a replacement formula; (b) translates the updated markup language version into a native version of the replacement formula ("native replacement formula"); (c) generates a rendering of the native replacement formula with typeset font ("typeset replacement formula"); and (d) causes the display device 102 to display the typeset replacement formula in the selection 502 for viewing (on the display device 102) by the user 210, as shown in FIG. 13.

Figure 14:
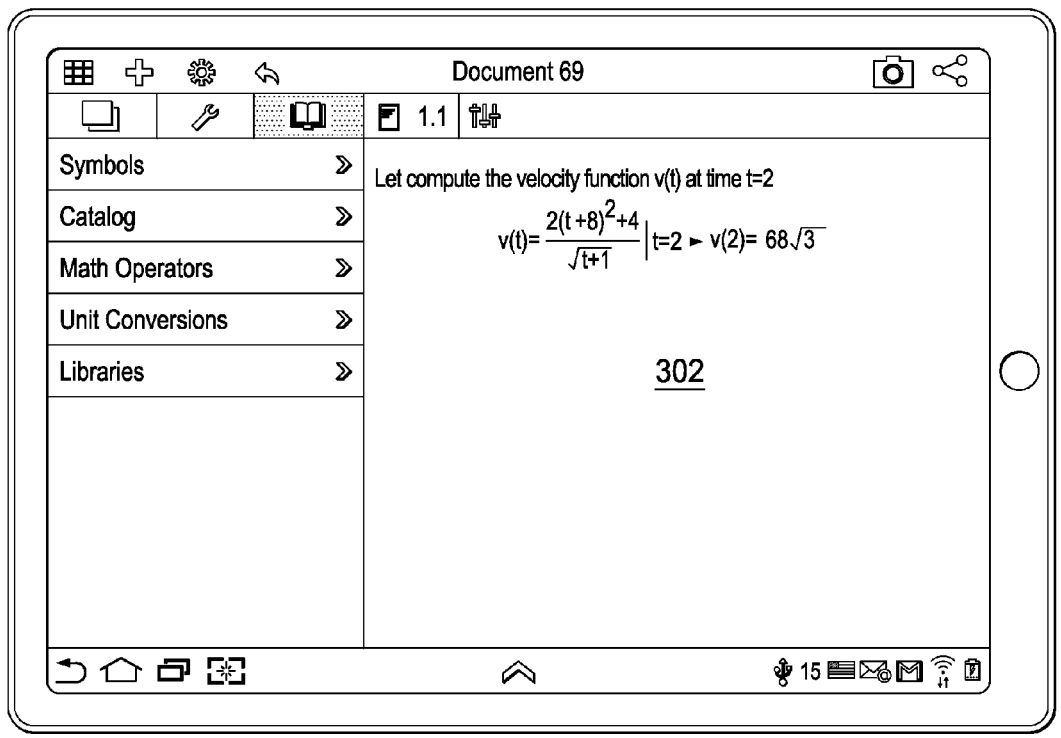
FIG. 14 is a diagram of a twelfth example screen that is displayed by the display device of the system of FIG. 1.

FIG. 14 is a twelfth example screen that is displayed by the display device 102. In this example: (a) after such repositioning of the selected superscript "2" in FIG. 13, the user 210 has physically touched (e.g., single tapped) the enter button 310 (FIG. 13); and (b) in response thereto, the processor 202 evaluates the replacement formula and causes the display device 102 to clear (e.g., erase) its highlighting of the selection 502 and its display of the editing window 304 (FIG. 13). In one embodiment, as part of such clearing, the processor 202 discards (e.g., ceases to store) the handwritten markings that the user 210 drew on the editing window 304, so those handwritten markings become unavailable for subsequent operation of the system 100. In evaluating the replacement formula (where t=2), the processor 202 causes the display device 102 to display a result of such evaluation, which is $v(2)=68 \cdot \sqrt{3}$ as shown in FIG. 14.

Figure 15:
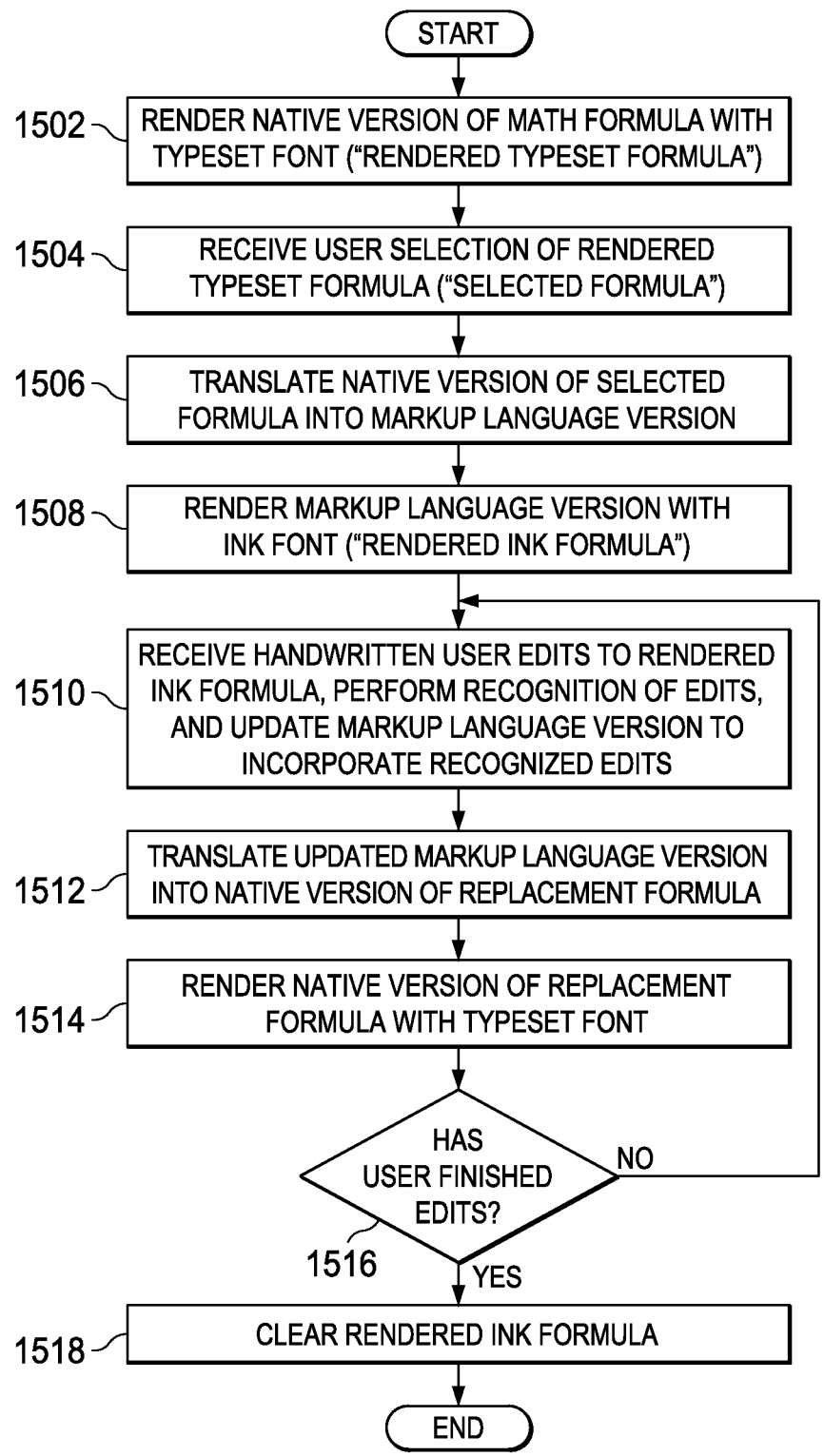
FIG. 15 is a flowchart of an operation of the system of FIG. 1.

FIG. 15 is a flowchart of an operation of the system 100. Such operation is discussed hereinabove in connection with FIGS. 3 through 14. At a step 1502, the processor 202 causes the display device 102 to display and evaluate the rendered typeset formula for viewing (on the display device 102) by the user 210, as discussed hereinabove in connection with FIGS. 4 and 5. As discussed hereinabove in connection with FIG. 3, the rendered typeset formula is a rendering of the native version (which has encoded symbols) with typeset font. At a next step 1504, the processor 202 receives (from the user 210) a selection from among the encoded symbols of the native version ("selected formula"), which the processor 202 causes the display device 102 to highlight, as discussed hereinabove in connection with FIG. 5.

At a next step 1506, the processor 202 translates the native version of the selected formula into the markup language (e.g., MathML) version thereof, as discussed hereinabove in connection with FIGS. 5 and 6. At a next step 1508, the processor 202: (a) generates the rendering of the markup language version with ink font ("rendered ink formula"); and (b) causes the display device 102 to display the rendered ink formula for viewing (on the display device 102) by the user 210, as discussed hereinabove in connection with FIG. 6. At a next step 1510, the processor 202: (a) from the user 210, receives handwritten edits to the rendered ink formula, as discussed hereinabove in connection with FIGS. 7, 8, 10 and 13 (e.g., in response to the user 210 drawing on the handwriting region 308); (b) performs recognition of such edits; and (c) updates the markup language version to incorporate such recognized edits within the replacement formula.

At a next step 1512, the processor 202 translates the updated markup language version into the native version of the replacement formula ("native replacement formula"). At a next step 1514, the processor 202: (a) generates the rendering of the native replacement formula with typeset font ("typeset replacement formula"); and (b) causes the display device 102 to display the typeset replacement formula for viewing (on the display device 102) by the user 210, as discussed hereinabove in connection with FIGS. 7, 9, 10 and 13.

At a next step 1516, the processor 202 determines whether the user 210 has finished such handwritten edits to the rendered ink formula. In response to determining that the user 210 has finished such handwritten edits to the rendered ink formula (e.g., in response to the user 210 physically touching the enter button 310), the operation continues from the step 1516 to a step 1518. At the step 1518, the processor 202 evaluates the replacement formula and causes the display device 102 to clear (e.g., erase): (a) its highlighting of the selected formula; and (b) its display of the rendered ink formula, as discussed hereinabove in connection with FIG. 14.

After the step 1518, the operation ends until a next occurrence thereof. Conversely, in response to the processor 202 determining (at the step 1516) that the user 210 has not yet finished such handwritten edits to the rendered ink formula, the operation returns from the step 1516 to the step 1510.

In an alternative embodiment, the steps 1506 and 1512 are optional. In one example implementation of such alternative embodiment: (a) the steps 1506 and 1512 are skipped; and (b) the steps 1508 and 1510 are performed with the native version instead of the markup language version. For example, if the native version is the same as the markup language version, then such implementation would be suitable.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by at least one device for editing a rendering of symbols, the method comprising:
    generating a first rendering of the symbols with typeset font;
    causing a display device to display the first rendering;
    from a user, receiving a selection of at least a portion of the symbols;
    generating a second rendering of the selection with ink font;
    causing the display device to display the second rendering;
    from the user, receiving at least one handwritten edit to the second rendering, wherein the at least one handwritten edit includes a handwritten marking on an ink font rendered symbol for combining with the ink font rendered symbol to modify the ink font rendered symbol;
    performing recognition of the handwritten edit, including recognition of how the handwritten marking combines with the ink font rendered symbol to modify the ink font rendered symbol;
    updating the selection to incorporate the recognized handwritten edit;
    generating a third rendering of the updated selection with typeset font; and
    causing the display device to display the third rendering for replacing at least a portion of the first rendering.

2. The method of claim 1, wherein the display device is a touchscreen, and comprising:
    from a physical touch by the user on a display area of the touchscreen, receiving handwritten markings; and
    performing recognition of the handwritten markings, and generating the symbols in response thereto.

3. The method of claim 2, and comprising:
    after generating the symbols, discarding the handwritten markings, so that the handwritten markings become unavailable.

4. The method of claim 1, wherein the display device is a touchscreen, and wherein receiving the selection includes:
    from a physical touch by the user on the first rendering, receiving the selection.

5. The method of claim 1, wherein the display device is a touchscreen, and wherein receiving the at least one handwritten edit includes:
    from a physical touch by the user on the second rendering, receiving the at least one handwritten edit; and
    causing the display device to display the handwritten edit superimposed upon the second rendering.

6. The method of claim 1, and comprising:
    translating the selection into a markup language version thereof, wherein the second rendering is generated of the markup language version.

7. The method of claim 6, wherein updating the selection includes:
    updating the markup language version to incorporate the recognized handwritten edit.

8. The method of claim 7, wherein generating the third rendering includes:
    translating the updated markup language version into a different format; and
    in response to the different format, generating the third rendering.

9. The method of claim 1, wherein the second rendering is larger than the first rendering.

10. The method of claim 1, wherein the symbols form a mathematical formula.

11. A system for editing a rendering of symbols, the system comprising:
    a display device for displaying information;
    at least one processor for: generating a first rendering of the symbols with typeset font; causing the display device to display the first rendering; from a user, receiving a selection of at least a portion of the symbols; generating a second rendering of the selection with ink font; causing the display device to display the second rendering; from the user, receiving at least one handwritten edit to the second rendering, wherein the at least one handwritten edit includes a handwritten marking on an ink font rendered symbol for combining with the ink font rendered symbol to modify the ink font rendered symbol; performing recognition of the handwritten edit, including recognition of how the handwritten marking combines with the ink font rendered symbol to modify the ink font rendered symbol; updating the selection to incorporate the recognized handwritten edit; generating a third rendering of the updated selection with typeset font; and causing the display device to display the third rendering for replacing at least a portion of the first rendering.

12. The system of claim 11, wherein the display device is a touchscreen, and wherein the at least one processor is for: from a physical touch by the user on a display area of the touchscreen, receiving handwritten markings; and performing recognition of the handwritten markings, and generating the symbols in response thereto.

13. The system of claim 12, wherein the at least one processor is for: after generating the symbols, discarding the handwritten markings, so that the handwritten markings become unavailable.

14. The system of claim 11, wherein the display device is a touchscreen, and wherein receiving the selection includes:
    from a physical touch by the user on the first rendering, receiving the selection.

15. The system of claim 11, wherein the display device is a touchscreen, and wherein receiving the at least one handwritten edit includes:
    from a physical touch by the user on the second rendering, receiving the at least one handwritten edit; and
    causing the display device to display the handwritten edit superimposed upon the second rendering.

16. The system of claim 11, wherein the at least one processor is for: translating the selection into a markup language version thereof, wherein the second rendering is generated of the markup language version.

17. The system of claim 16, wherein updating the selection includes:
    updating the markup language version to incorporate the recognized handwritten edit.

18. The system of claim 17, wherein generating the third rendering includes:
    translating the updated markup language version into a different format; and
    in response to the different format, generating the third rendering.

19. The system of claim 11, wherein the second rendering is larger than the first rendering.

20. The system of claim 11, wherein the symbols form a mathematical formula.

21. A computer program product for editing a rendering of symbols, the computer program product comprising:
    a non-transitory computer-readable storage medium; and a computer-readable program stored on the non-transitory computer-readable storage medium, wherein the computer-readable program is processable by an information handling system for causing the information handling system to perform operations including: generating a first rendering of the symbols with typeset font; causing a display device to display the first rendering; from a user, receiving a selection of at least a portion of the symbols; generating a second rendering of the selection with ink font; causing the display device to display the second rendering; from the user, receiving at least one handwritten edit to the second rendering wherein the at least one handwritten edit includes a handwritten marking on an ink font rendered symbol for combining with the ink font rendered symbol to modify the ink font rendered symbol; performing recognition of the handwritten edit, including recognition of how the handwritten marking combines with the ink font rendered symbol to modify the ink font rendered symbol; updating the selection to incorporate the recognized handwritten edit; generating a third rendering of the updated selection with typeset font; and causing the display device to display the third rendering for replacing at least a portion of the first rendering.

22. The computer program product of claim 21, wherein the display device is a touchscreen, and wherein the operations include: from a physical touch by the user on a display area of the touchscreen, receiving handwritten markings; and performing recognition of the handwritten markings, and generating the symbols in response thereto.

23. The computer program product of claim 22, wherein the operations include: after generating the symbols, discarding the handwritten markings, so that the handwritten markings become unavailable.

24. The computer program product of claim 21, wherein the display device is a touchscreen, and wherein receiving the selection includes:
    from a physical touch by the user on the first rendering, receiving the selection.

25. The computer program product of claim 21, wherein the display device is a touchscreen, and wherein receiving the at least one handwritten edit includes:
    from a physical touch by the user on the second rendering, receiving the at least one handwritten edit; and
    causing the display device to display the handwritten edit superimposed upon the second rendering.

26. The computer program product of claim 21, wherein the operations include: translating the selection into a markup language version thereof, wherein the second rendering is generated of the markup language version.

27. The computer program product of claim 26, wherein updating the selection includes:
    updating the markup language version to incorporate the recognized handwritten edit.

28. The computer program product of claim 27, wherein generating the third rendering includes:
    translating the updated markup language version into a different format; and
    in response to the different format, generating the third rendering.

29. The computer program product of claim 21, wherein the second rendering is larger than the first rendering.

30. The computer program product of claim 21, wherein the symbols form a mathematical formula.

* * * * *